Figure 1:
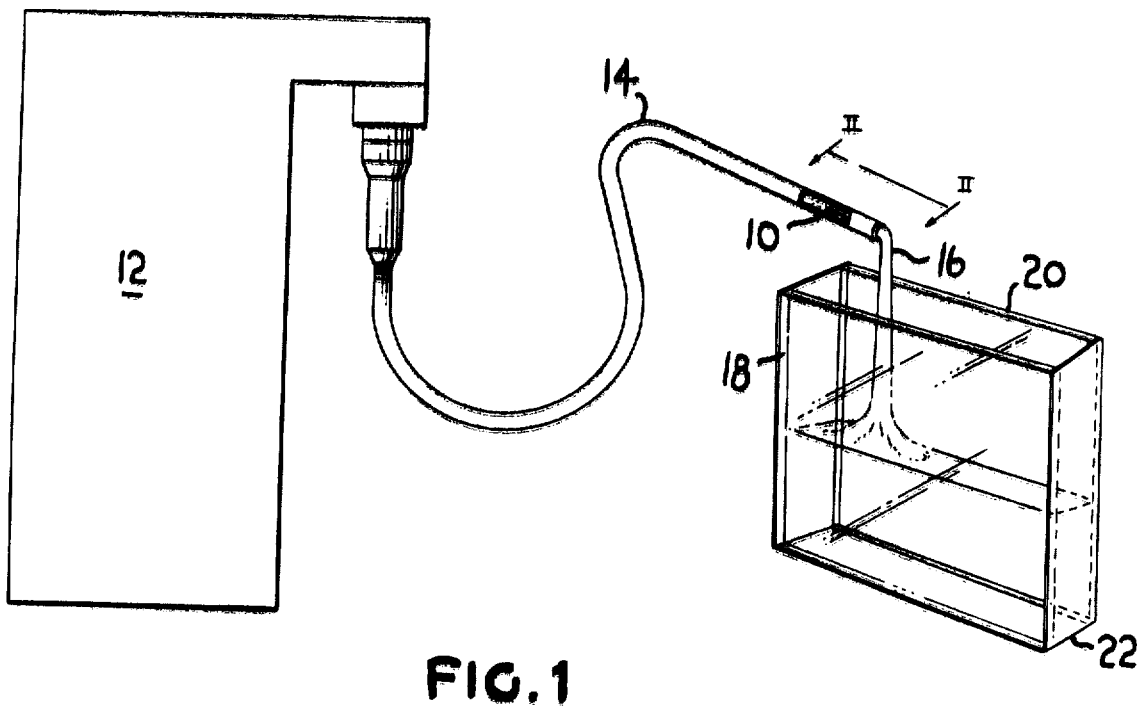

United States Patent
Cherenko et al.

[11] 3,894,024
[45] July 8, 1975

[54] METHOD FOR CASTING RESINS

[75] Inventors: Joseph Cherenko, Valencia;
Raymond P. Harrison, Pittsburgh;
Joseph D. Kelly, Cheswick; William I. Frey, Curtisville, all of Pa.

[73] Assignee: PPG Industries, Inc., Pittsburgh, Pa.

[22] Filed: Jan. 9, 1974

[21] Appl. No.: 431,995

Related U.S. Application Data

[63] Continuation of Ser. No. 204,504, Dec. 3, 1971, abandoned, which is a continuation of Ser. No. 881,106, Dec. 1, 1969, abandoned.

[52] U.S. Cl. ............ 264/261; 156/99; 260/77.5 AA; 264/331; 264/349
[51] Int. Cl. .............................................. B29b 1/04
[58] Field of Search .......... 264/331, 216, 261, 349, 264/108; 260/75 NE, 77.5 AA, 2.5 BC, 2.5 BD; 425/223–224; 259/4; 156/99

[56] References Cited
UNITED STATES PATENTS

| | | | |
|---|---|---|---|
| 2,917,489 | 12/1959 | Gladding et al. | 264/331 |
| 2,928,128 | 3/1960 | Carlson et al. | 264/212 |
| 3,310,533 | 3/1967 | McElroy | 260/2.5 BD |
| 3,359,350 | 12/1967 | Godfrey | 264/108 |
| 3,490,978 | 1/1970 | Shockey | 264/331 |
| R24,514 | 8/1958 | Hoppe et al. | 260/77.5 AA |

FOREIGN PATENTS OR APPLICATIONS

| | | | |
|---|---|---|---|
| 935,763 | 1963 | United Kingdom | 260/2.5 BC |
| 1,014,077 | 1957 | Germany | 259/4 |

*Primary Examiner*—Robert F. White
*Assistant Examiner*—Gene Auville
*Attorney, Agent, or Firm*—Edward I. Mates; William J. Uhl

[57] ABSTRACT

A method for casting liquid resinous material containing essentially immiscible, reactive constituents which involves mixing/reacting said material to produce a liquid, substantially homogeneous mass containing a predominance of partially reacted reactive constituents and casting said resinous material before the minimum time for complete reaction of a substantial portion of said constituents. The method is particularly useful for casting polyurethane-type resinous materials between a pair of rigid, transparent sheets to provude an essentially striae-free laminated window structure.

8 Claims, 2 Drawing Figures

3,894,024

METHOD FOR CASTING RESINS

This is a continuation of application Ser. No. 204,504, filed Dec. 3, 1971, now abandoned which in turn is a continuation of application Ser. No. 881,106, filed Dec. 1, 1969, now abandoned.

BACKGROUND OF THE INVENTION

This invention relates to casting batches of liquid resinous materials and streams of flowing liquid resinous materials to insure uniformity of properties. More particularly, the present invention relates to eliminating striae in and thereby to improving the optical quality of cast transparent resins produced from essentially immiscible or mutually insoluble, reactive liquid components.

Figure 2:
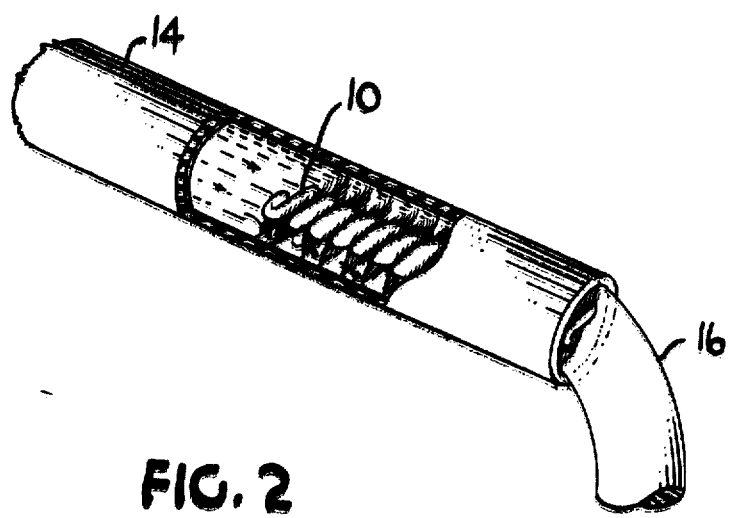

The foregoing and other objects, features and advantages of this invention will become more apparent from the detailed description that follows when taken in conjunction with the drawing, in which:

FIG. 1 is a schematic illustration, partly in section, of a preferred casting arrangement utilizing the principle of this invention; and FIG. 2 is an enlargement of a portion of FIG. 1, as viewed along the line II—II.

Liquid resinous materials containing essentially immiscible, reactive chemical constituents are often difficult to cast so as to obtain uniform cured resin properties. This lack of uniformity is particularly detrimental if the resinous materials are transparent and excellent optical quality is desired, such as with cast sheets used in glazings alone or in laminated window structures or in potting and encapsulating applications. An example of such immiscible, reactive constituents is that between isocyanate terminated poly(oxyalkylene)glycol and curing agents, such as 1,4-butanediol and trimethylol propane.

Whenever immiscible or essentially immiscible, reactive constituents are initially mixed, a dispersion or intimate interblend results which increases the surface of contact between the reactive components. In the case of the example above, the reaction of isocyanate and hydroxyl groups commences to form the polyurethane links. All reactants are multi-functional, containing at least two reactive groups per molecule. The rates of reaction of the various combinations of reacting groups are such that, after initial mixing, at each point in time the total mixture may consist of a polyblend of completely unreacted reactants, reactants in which only one group has reacted, reactants in which two groups have reacted and reactants in which all of the reactive groups have reacted.

Ideally, it is desired to cast a resin in which one and only one group of each reactant has reacted. The completely unreacted materials are thereby no longer present to cause a phase separation. Also, if no reactant has two or all of its groups reacted, the presence of gelled materials from complete reaction is avoided. The latter may also lead to phase separation.

In actual practice, the presence of reactants at all different stages of reaction leads to phase separations since the constituents of the total mixture are generally of different densities. Casting of a liquid resinous material containing separate phases or a mixture of reactants at different stages of reaction results in non-homogeneity within the cast resin and one manifestation of this effect appears often as striae lines in a transparent resin. These striae lines are optical aberrations caused by the non-uniform properties of the separate phases. Depending upon the properties of the resinous material and the processing conditions, the striae may be short or long, close together or widely separated, light or heavy, and in various configurations.

It has been found that gentle stirring of batches of resinous materials containing immiscible or essentially immiscible, reactive constituents for at least a minimum period of time results in a state of reaction at which no phase separation will occur, provided that all parts of the reacting batch have been thoroughly mixed during this period. Casting of the resinous material should be accomplished at this point or shortly thereafter so as to avoid casting difficulties and optical problems associated with a reaction product that is increasing in viscosity and approaching gelation. The time of stirring is necessarily a function of reactive constituents and formulations as well as casting and mixing conditions. It is generally simpler to determine this stirring time empirically. The principles apply equally well to non-transparent resinous materials, although determination of stirring time required to avoid occurrence of phase separation is more difficult. In this latter instance, sectioning of cured resinous materials which have been stirred for various times is necessary to find the minimum time for avoidance of phase separation. The degree and duration of stirring are related to the rate of the reaction, in all the cases cited, with, for example, more vigorous stirring and shorter durations of stirring desired for faster reacting materials.

The same principles apply to continuously cast liquid resinous materials as well as to batch casting as described above. Mixing must be provided for liquid resinous materials flowing through a hose or tubing from the pumping or dispensing unit to the space into which the material is cast. This mixing is necessary so as to maximize the surface of contact between the reactive constituents and to maintain the dispersion of the different density constituents until the reaction has proceeded to the extent that phase separation will no longer occur.

The basic requirements for the desired homogeneity are a sufficient residence time after initial mixing of the constituents, such as proper dispensing hose volume for the particular pumping rate, adequate mixing upon initial contact of the reactive constituents and adequate mixing during the passage of the liquid resinous material through the dispensing hose. Adequate mixing during the passage of the liquid through the dispensing hose is relatively simple to achieve if the liquid is of low viscosity. Use of simple baffles in the hose or other methods of inducing turbulence are generally adequate.

This invention deals mainly with the most difficult application in which to achieve adequate mixing, the one in which the liquid resinous mixture or system is of relatively high viscosity, about 100 centipoises or greater, although the principles may be applied equally well to resinous systems exhibiting lower viscosities. Many methods of inducing mixing also present significant resistances to flow, resulting in large pressure drops, which in turn often cause other operating problems. The ideal mixer is inexpensive, free of maintenance, easily procured, easily installed and easily operated.

This invention deals more specifically with the use of circular brushes constructed of a minimum diameter shaft and many fine diameter bristles, and placed directly in the dispensing hose. The outside diameter of the brushes is the same as or of slightly larger diameter than the inside diameter of the hose. The brush construction materials should be compatible with the liquid resinous material, its constituents and all reaction products. The optimum size of the brushes, the location of the brushes, the number of the brushes, the hose internal volume, diameter and length are determined empirically as those producing the best results from the standpoint of homogeneous cast resin.

Gun barrel cleaning brushes, the type easily obtained in sporting goods stores and sporting goods departments, have been tested extensively and found to perform excellently in providing a high degree of mixing/stirring in flowing streams of resinous material. They meet all the requirements set forth: low cost and simplicity of procurement, installation, operation and maintenance. They are particularly advantageous because they perform their function without moving parts.

This invention applies equally well to other types of brushes, such as boiler tube cleaning brushes and others with an adequate supply of bristles so that sufficient turbulence is incurred to accomplish the desired mixing/stirring. This invention applies equally well also to other devices and methods for accomplishing mixing/stirring while the reaction proceeds to the point at which phase separation no longer occurs. Examples of other mixing/stirring devices and methods are baffles, mechanical packing such as Raschig Rings, Berl Saddles, spheres, chain and other devices for inducing flow disturbances and consequential mixing/stirring. Other examples include, but are not limited to, mechanical stirrers of various radial and oscillating designs, vibrating reeds and members, and mixing by input of ultrasonic energy. Any mixing/stirring device or method which provides sufficient mixing and which is properly applied and tested should be satisfactory in achieving the benefits described in this invention.

The minimum stirring times to avoid phase separation in batches of thermosetting resinous materials comprised of essentially immiscible, reactive constituents are not identical to the mixing-residence times required in the dispensing hose of continuously cast materials of the same formulation. The temperature-time history and extent of mixing are different between batch preparations and continuous casting of the same resinous systems. The minimum times must be determined empirically for the different approaches. In either or both approaches, good dispersion or an intimate interblend of such immiscible, reactive constituents is required to initiate an overall reaction. Depending on constituent densities and other properties, further stirring after initiating reaction may or may not be required until the minimum time is reached. Efficient mixing of the resultant polyblend of materials is necessary just before casting to achieve homogeneity and eliminate separate phases that may have formed. This final mixing should occur contemporaneously with the minimum times of stirring previously determined to avoid subsequent phase separation.

This invention is not limited in application to polyurethane-type resin systems but should be of equivalent benefit with all types of thermosetting reactive systems in which an insolubility or immiscibility exists between reactive components, which immiscibility and its undesirable effects can be efficiently overcome through mixing during the reaction phases. This invention is likewise not limited to specific types of polymer preparation, such as one-shot or prepolymer approaches, or to materials of specific chemical and physical properties.

In the thermosetting, isocyanate terminated poly(oxyalkylene)glycol-polyol resin system previously cited, use of four gun barrel cleaning brushes 10 (see FIGS. 1 and 2), designed for 410 gage shotgun application, consistently reduced the striae occurring in a ¼-inch thick sheet of cured resin by at least 95 per cent when compared to the sheets prepared at the best combination of casting and curing conditions but without the brushes. The constituent materials were heated to 130°F. and mixed by a dispensing machine 12 designed and constructed by the Admiral Equipment Corporation of Akron, Ohio. The resulting intimate interblend of liquid resinous material was pumped by the dispensing machine at a rate of one pound per minute through 20 feet of ⅜-inch inside diameter polytetrafluoroethylene-lined hose 14 before contacting the brushes 10 which were placed in the last 16 inches of hose.

The residence time during mixing and passage of the resinous mixture through the hose was such as to produce a predominance of partially reacted, reactive constituents. Passage of the resinous mixture through the brushes 10 provided sufficient turbulent mixing to produce a viscous, substantially homogeneous, resinous mass. This viscous, substantially homogeneous material 16 was then cast between a pair of rigid transparent glass sheets 18 and 20 that had been formed into a casting cell by spacing the sheets and sealing the perimeter therebetween, about three sides, with a sealing tape 22. The cast interlayer material was thereafter cured in an ambient environment maintained at an elevated temperature of about 285°F., to produce a transparent laminated structure having an interlayer that was visually free of striae. Other cure temperatures could be used depending upon the results desired. For example, room temperature cures are possible, although generally cure temperatures of about 175°F. to 300°F. are used in actual practice. Changing of the number of brushes, their location, and other processing conditions added no further improvement, and in many circumstances produced poorer results.

This invention is not limited to the operating conditions in the example above, because a change of any or all constituent materials or a change in any operating condition would probably require changes in other operating conditions. This invention is therefore not limited to the number, type and location of the brushes or other device and method for achieving the necessary degree of mixing. Likewise, this invention is not limited as to volume of initial mixer, dispensing equipment hose or other container, such as a hold container along the hose line, since these are all dependent upon the resin system materials and the selected operating conditions. Additionally, this invention is not limited to the shape, size or design of the end product or whether the cured resin prepared is used alone or in combination with other materials, such as one or more glass sheets in a laminated article.

Use of the brushes does not affect the properties of the cured resin when this resin is compared with other resin prepared in an identical manner except for the use of the brushes. This invention is not limited to those applications in which the brushes or other mixing/stirring method or device does not affect the properties of the cured resin. If the brushes cause a change in properties, adjustments in resin formulation or processing conditions are made to achieve cured resin properties the same as without the brushes or to prepare cured resin exhibiting the desired properties.

Although the present invention has been described with particular reference to the specific details of a certain preferred embodiment thereof, it is not intended that such details shall be regarded as limitations upon the scope of the invention except insofar as included in the accompanying claims.

We claim:

1. In a method for making a transparent laminated window from two spaced-apart glass sheets separated by a cured resinous interlayer, said method comprising mixing at a first mixing zone essentially immiscible, reactive constituents, followed by flowing said mixture into and through a conduit connecting and separating the first mixing zone from a pair of spaced-apart transparent rigid sheets, said mixture partially reacting in the conduit to form a flowable resinous liquid; casting said resinous liquid between the pair of rigid transparent sheets and curing the cast resinous liquid to produce the transparent laminated window, the improvement comprising:

a. subsequently mixing the resinous liquid while it is flowing through said conduit in a second mixing zone located apart from said first mixing zone by means of a mixing device to homogenize the resinous liquid such that when it is cast between a pair of rigid transparent sheets and cured, the resultant cured resinous interlayer is visually free of striae.

2. The method according to claim 1 in which said subsequent mixing occurs by passing said resinous liquid through a spiral-shaped static mixer.

3. The method according to claim 2 in which said subsequent mixing occurs by passing said resinous liquid through bristles of a spiral-shaped brush.

4. The method according to claim 1 wherein the essentially immiscible, reactive constituents comprise polyurethane-forming reactants.

5. The method according to claim 4 wherein the essentially immiscible, reactive constituents comprise isocyanate-terminated poly (oxyalkylene) glycol and polyol curing agents.

6. The method according to claim 4 in which said resinous material at the step of casting has a viscosity upwards from about 100 centipoises.

7. The method according to claim 5 wherein said curing agent comprises 1,4-butanediol and trimethylol propane.

8. The method according to claim 7 wherein said constituents are preheated to about 130°F. prior to mixing.

* * * * *